(12) United States Patent
Lippert et al.

(10) Patent No.: US 6,367,776 B1
(45) Date of Patent: Apr. 9, 2002

(54) FLOW CONTROL DEVICE AND APPARATUS FOR MOUNTING SAME

(75) Inventors: Harry G. Lippert, Cameron; Vernon J. Krupa, Chippewa Falls; John A. Ulcej, Colfax, all of WI (US)

(73) Assignee: Extrusion Dies, Inc., Chippewa Falls, WI (US)

( * ) Notice: Subject to any disclaimer, the term of this patent is extended or adjusted under 35 U.S.C. 154(b) by 0 days.

(21) Appl. No.: 09/296,115

(22) Filed: Apr. 21, 1999

(51) Int. Cl.⁷ ............................. B29C 47/08; F16K 7/12
(52) U.S. Cl. ...................... 251/331; 251/264; 425/381; 92/98 R
(58) Field of Search ............... 251/61.1, 331, 251/264; 425/381; 92/98 R, 96

(56) References Cited

U.S. PATENT DOCUMENTS

| | | | |
|---|---|---|---|
| 2,705,608 A | * 4/1955 | Phillips | 251/61.1 X |
| 3,680,997 A | 8/1972 | Dukert et al. | |
| 3,690,344 A | * 9/1972 | Brumm | 251/61.1 X |
| 3,836,113 A | * 9/1974 | Johnson | 251/61.1 X |
| 3,884,611 A | 5/1975 | Anderson et al. | |
| 4,293,517 A | 10/1981 | Knox | |
| 4,372,739 A | 2/1983 | Vetter et al. | |
| 4,411,614 A | 10/1983 | Feathers | |
| 4,521,359 A | 6/1985 | Tsien | |
| 4,619,802 A | 10/1986 | Cloeren | |
| 4,861,536 A | 8/1989 | Graf et al. | |
| 4,892,473 A | 1/1990 | Elia et al. | |
| 4,922,192 A | 5/1990 | Gross et al. | |
| 5,007,395 A | * 4/1991 | Wakeling | 251/61.1 X |
| 5,066,435 A | 11/1991 | Lorenz et al. | |
| 5,067,432 A | 11/1991 | Lippert | |
| 5,090,660 A | * 2/1992 | Ratelband | 251/61.1 |
| 5,149,481 A | 9/1992 | Gross et al. | |

(List continued on next page.)

FOREIGN PATENT DOCUMENTS

| | | |
|---|---|---|
| CA | 2032257 | 6/1991 |
| CA | 2054889 | 5/1992 |
| DE | 1 125 146 | 8/1962 |
| DE | 44 00 069 | 4/1995 |
| DE | 295 14 043 | 1/1996 |
| DE | 195 35 930 | 1/1997 |
| EP | 0 484 721 | 5/1992 |
| WO | 95/18711 | 7/1995 |

OTHER PUBLICATIONS

PCT International Search Report dated Sep. 30, 1998, International Appl. No. PCT/US/98/12479.
Gross et al. "Membran Statt Staubalken," *Kunststoffe*, vol. 84, No. 10 (10/94), pp. 1352–1356.
PCT Written Opinion dated Mar. 15, 1999, International Application No. PCT/US/98/12479.
PCT International Preliminary Examination Report, dated Jul. 9, 1999, International Application No. PCT/US98/12479.

*Primary Examiner*—Kevin Lee
(74) *Attorney, Agent, or Firm*—William E. McCracken & Associates (57) ABSTRACT

A flow control device is mounted within a channel of an extrusion die, wherein the channel is defined by a base surface and a side surface normal to the base surface. The device includes a main body and an auxiliary body, wherein the main body includes a side portion that sealingly contacts the side surface of the channel when a force is exerted on the side portion, and the auxiliary body is in contact with the base surface of the channel. The device further includes a flexible membrane on a face opposite the auxiliary body which can influence the flow of material through the channel by moving in a direction perpendicular to the direction of material flow. A sealing apparatus is used to prevent leakage of material between the die and the flexible membrane. The sealing apparatus includes a gasket disposed adjacent an end surface of the membrane and means for causing the gasket to apply a force against the end surface such that the gasket seals against the membrane.

10 Claims, 5 Drawing Sheets

U.S. PATENT DOCUMENTS

| | | |
|---|---|---|
| 5,242,742 A | 9/1993 | Funk et al. |
| 5,273,420 A | 12/1993 | Gross et al. |
| 5,275,547 A | 1/1994 | Brown |
| 5,286,436 A | 2/1994 | Funk et al. |
| 5,494,429 A | 2/1996 | Wilson et al. |
| 5,516,273 A | 5/1996 | Delmore et al. |
| 5,529,730 A | 6/1996 | Gross |
| 5,542,836 A | 8/1996 | Gross et al. |
| 5,608,637 A | 3/1997 | Wang et al. |
| 5,909,747 A * | 6/1999 | Schieber ................. 251/331 X |

* cited by examiner

FLOW CONTROL DEVICE AND APPARATUS FOR MOUNTING SAME

FIELD OF THE INVENTION

The present invention relates generally to extrusion dies, and more particularly to apparatus for controlling material flow through the die.

BACKGROUND ART

Extrusion processes have long been used to produce sheets or webs of formable material, such as thermoplastic. These processes generally involve forcing a viscous material through a die typically comprising an inlet, a cavity, and an exit. As the material passes through the die, it is often necessary to influence the flow to obtain a product at the die exit having desirable characteristics.

Past methods of influencing material flow have included the use of a flow control device mounted in a channel within a die cavity, such as a restrictor bar, a flexible membrane, or another insert. Since most extrusion processes operate under high pressure, leakage of material into spaces between the insert and the channel is a significant concern. Build-up of material in the channel can prevent proper flow control and result in burning of material therein. Hence, the channel and insert must be designed and machined to tolerances that will ensure a tight sealing fit and thereby prevent leakage.

The assignee of the instant application currently offers for sale a die having a flexible membrane mounted by spaced mounting members in correspondingly-shaped tapered channels in the die cavity. Bolts extend into the mounting members and are tightened to cause the members to seal against walls forming the tapered channel. End surfaces of the membrane are clamped between body members of the die to form a seal between the die and the membrane.

While this arrangement of elements is effective to accomplish flow control, some drawbacks are encountered. Specifically, the installation process is complicated and expensive. Further, machining of the tapered channels is difficult to accomplish with the required degree of precision and is not well suited (due to the channel configuration) to large-scale production techniques. In addition, re-working of such a die would likely result in a substantial amount of refitting of the flow control device in the channels. Manufacture of an aftermarket flow control device without the original tooling would also be problematic. Furthermore, clamping the end surfaces of the membrane can restrict adjustment of the membrane which, in turn, can make it more difficult to achieve a desired flow control.

SUMMARY OF THE INVENTION

According to one aspect of the present invention, a flow control device includes a flexible membrane movable in a certain direction and having a built-up end portion, a gasket disposed adjacent the end portion, and means for causing the gasket to apply a force against the built-up end portion in a direction transverse to the certain direction such that the gasket seals against the flexible membrane.

Other advantages of the invention will be apparent to those skilled in the art from the following detailed description taken in conjunction with the drawings and the appended claims.

DETAILED DESCRIPTION OF THE INVENTION

Figure 1:
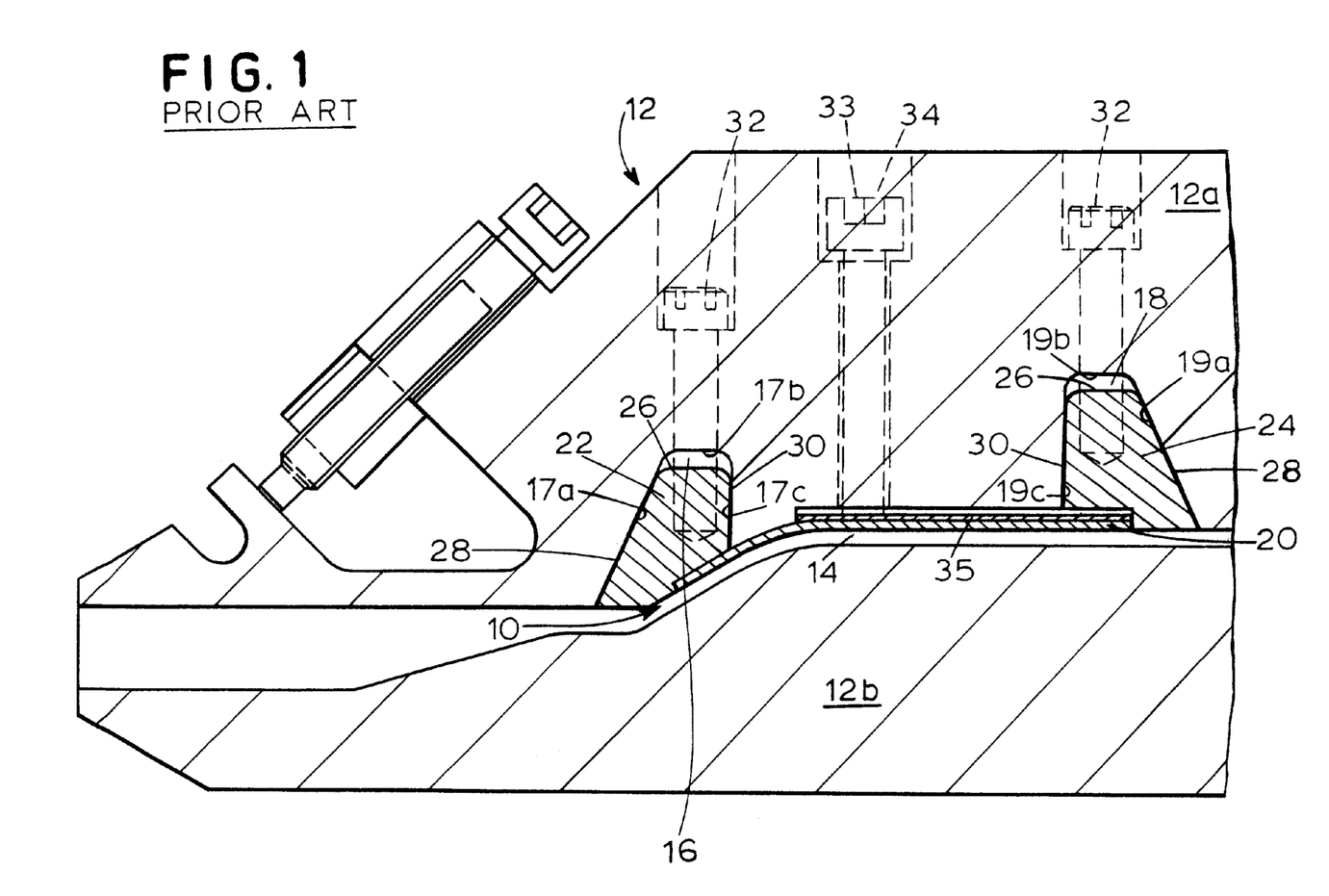
FIG. 1 comprises a cross-sectional view of a prior art flow control device disposed within a die.

Referring now to the drawings, wherein like reference numerals designate identical or corresponding parts throughout the several views, and more particularly to FIG. 1 thereof, a prior art flow control device 10 is disposed within an extrusion die 12. The flow control device 10 is disposed within a die cavity 14 having a first tapered channel 16 and a second tapered channel 18. In the device illustrated in FIG. 1, sidewalls 17a, 19a in part defining the channels 16, 18 are disposed at angles of other than 90° with respect to base surfaces 17b, 19b, respectively. The flow control device 10 comprises a flexible membrane 20, a first mounting member 22, and a second mounting member 24. The flexible membrane 20 is disposed between and joined to the mounting members 22, 24. Furthermore, the flexible membrane 20 is movable in a direction perpendicular to the direction of flow and has end surfaces (not shown) that extend beyond the mounting members 22, 24.

Each of the mounting members 22, 24 includes a base 26 and two sides 28, 30 adjacent the base 26. The two sides 28, 30 of the mounting member 22 are complementarily-shaped with respect to the sidewall 17a and a sidewall 17c forming the channel 16. Similarly, the two sides 28, 30 of the mounting member 24 are complementarily-shaped with respect to the sidewall 19a and a sidewall 19c forming the channel 18. Bolts 32 extending through bores in the die and into the mounting members 22, 24 secure the flow control device 10 within the tapered channels 16, 18. One or more additional bolts 33 extend through threaded bores 34 in the die and push against a stiffener plate 35 which is disposed in contact with a back surface of the membrane 20. The stiffener plate 35 is provided to permit adjustment of the position of the flexible membrane 20 according to the desired flow characteristics and end product. The end surfaces of the flexible membrane 20 are clamped between upper and lower body members 12a, 12b, of the die 12 to form a seal between the die 12 and the flexible membrane 20.

As discussed above, disadvantages are encountered with the design of the flow control device 10 shown in FIG. 1 including the production, re-working, and aftermarket design problems noted above.

Shown in FIGS. 2 through 7 is one embodiment of a mounting apparatus according to the present invention which overcomes the problems encountered with the prior art flow control device 10 of FIG. 1. With specific reference to FIGS. 2 through 4, a flow control device 40 is disposed within a die cavity 42 of a flow handling apparatus, shown here as an extrusion die 44. The flow control device 40 is disposed within a channel 46 defined by a base surface 48, a first side surface 50, and a second side surface 52. Each of the side surfaces 50, 52 is normal to the base surface 48.

Figure 2:
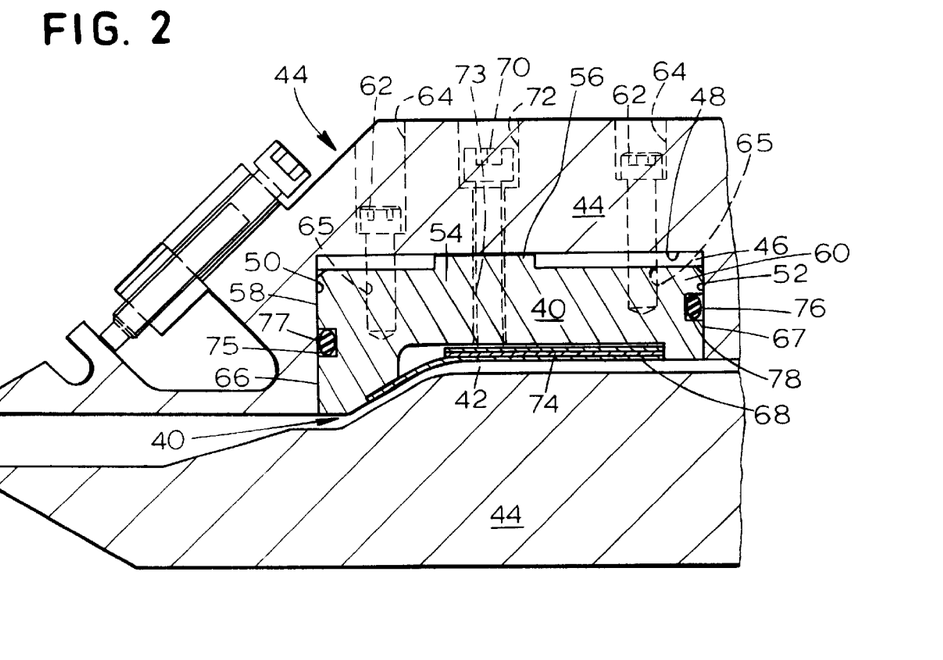
FIG. 2 comprises a cross-sectional view of a flow control device disposed within a die cavity according to the present invention.
Figure 3:
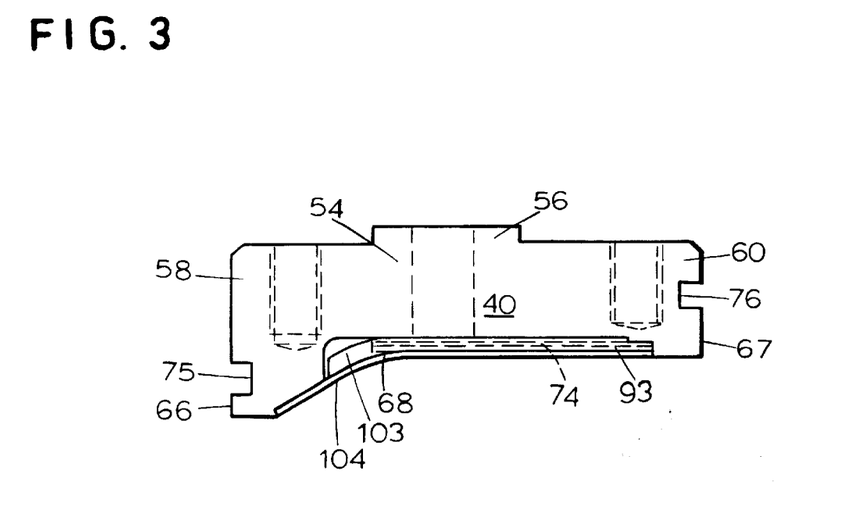
FIG. 3 comprises an enlarged end elevational view of the flow control device of FIG. 2.
Figure 4:
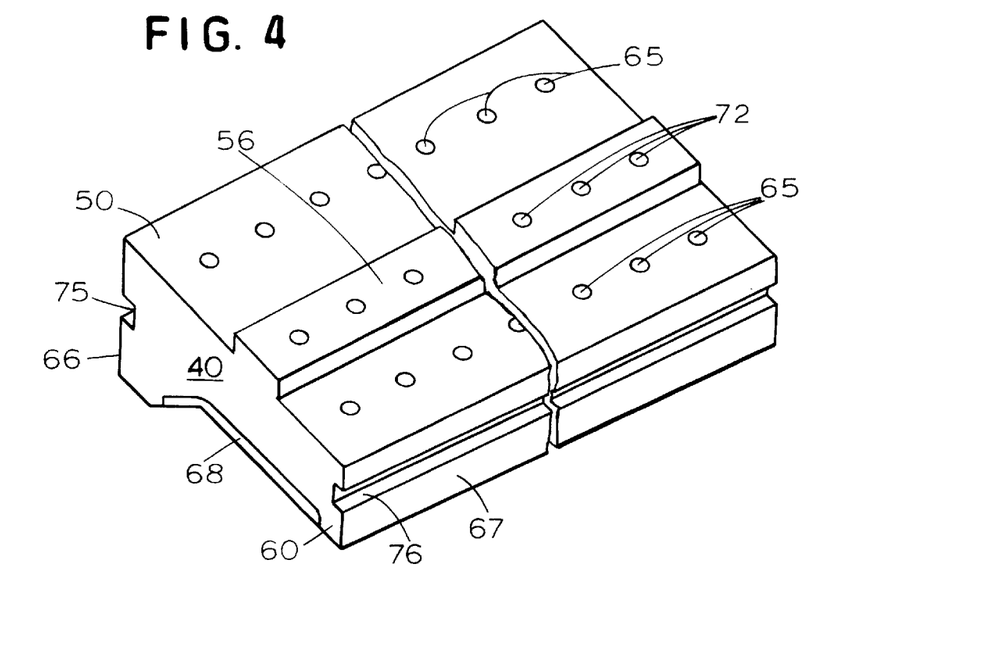
FIG. 4 comprises a perspective view of the flow control device of FIG. 2.

The flow control device 40 has a main body 54 and an auxiliary body 56 joined to and extending away from the main body 54. The main body includes a first side portion 58 and a second side portion 60. When disposed in the channel 46, the auxiliary body 56 extends into contact with the base surface 48 of the channel 46. Furthermore, the first side portion 58 is adjacent to the first side surface 50 and the second side portion 60 is adjacent to the second side surface 52. The flow control device 40 is made of a material having a coefficient of thermal expansion similar to that of the extrusion die 12.

The flow control device 40 is held in place in the channel 46 by force-transmitting members 62 which may be bolts, screws or other fasteners. The force-transmitting members 62 are disposed in bores 64 in the extrusion die 44 and further extend into threaded bores 65 in the side portions 58, 60 of the flow control device 40. Typically, the spacing between the force-transmitting members 62 is between about 0.75 inches and about 2.5 inches.

The flow control device 40 further includes a flexible membrane 68 joined to and disposed between each of the side portions 58, 60 on a face opposite the auxiliary body 56. In a first embodiment, the membrane 68 is welded or otherwise joined to the main body 54. A number of force transmitting members 70, which may be threaded bolts, screws, or other fasteners, are disposed in bores 72 in the die 44 and extend through threaded portions 73 and push against at least one, and preferably two (or more) stiffener plates 74. The stiffener plates 74 in turn serve as a rigid member or support for the flexible membrane 68. The force transmitting members 70 may be threaded into or out of the threaded portions 73 to change the profile of the membrane 68 and, thus, change the flow of material in the die cavity 42. For example, when one or more of the force transmitting members 70 is (or are) threaded into the threaded portions 73, the stiffener plates 74 move the membrane 68 into the flow of material through the die cavity 42. Typically, the spacing between the force-transmitting members 70 is between about 0.75 inches and about 2.5 inches.

Each of the side portions 58, 60 further includes a sealing surface 66, 67, respectively, and a channel 75, 76, respectively, in which a sealing element 77, 78 may be disposed. The sealing element 77, 78 preferably is constructed of a formable material capable of operation in a hot and corrosive environment, such as a metal- or carbon-impregnated Teflon™ material or a metal material.

Figure 5:
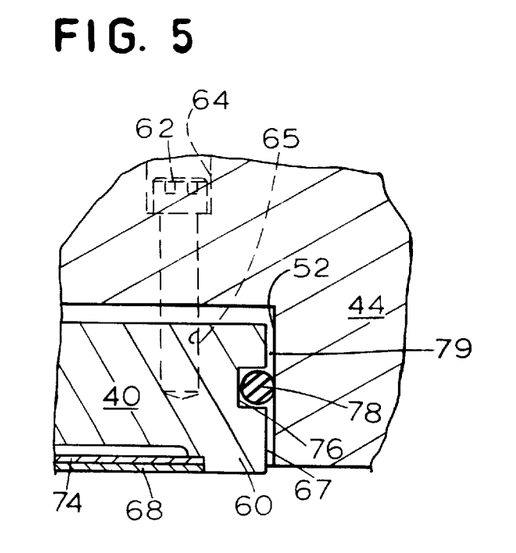
FIGS. 5 and 6 are fragmentary, enlarged, cross-sectional views illustrating the installation of the flow control device of FIG. 2.

As shown in FIG. 5, before the members 62 are threaded into the bores 65 to exert forces on the side portions 58, 60, a gap 79 exists between the side portions 58, 60 and the side surface 50, 52. (This gap is shown in exaggerated fashion in FIG. 5 for the sake of explanation.)

Figure 6:
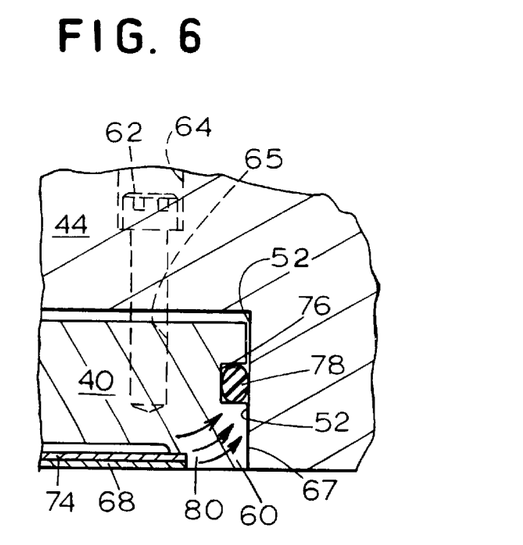

However, as seen in FIG. 6, when the members 62 are threaded into the bores 65, bending moments are introduced in the side portions 58, 60, causing such portions to deflect about the auxiliary body 56 (which is in contact with the base surface 48, as noted previously). Arrows 80 shown in FIG. 6 illustrate the movement of the side portion 60 during tightening of the members 62. This movement eventually causes each sealing surface 66, 67 to contact each side surface 50, 52, respectively, over areas of the surfaces 50, 52, 66, 67. Further, each sealing element 77, 78 is compressed within each channel 75, 76 and bears against the side surface 50, 52, respectively. Thus, a tight seal forms between the side portions 58, 60 and the side surfaces 50, 52 to prevent leakage into the space between the main body 54 and the channel 46.

Figure 7:
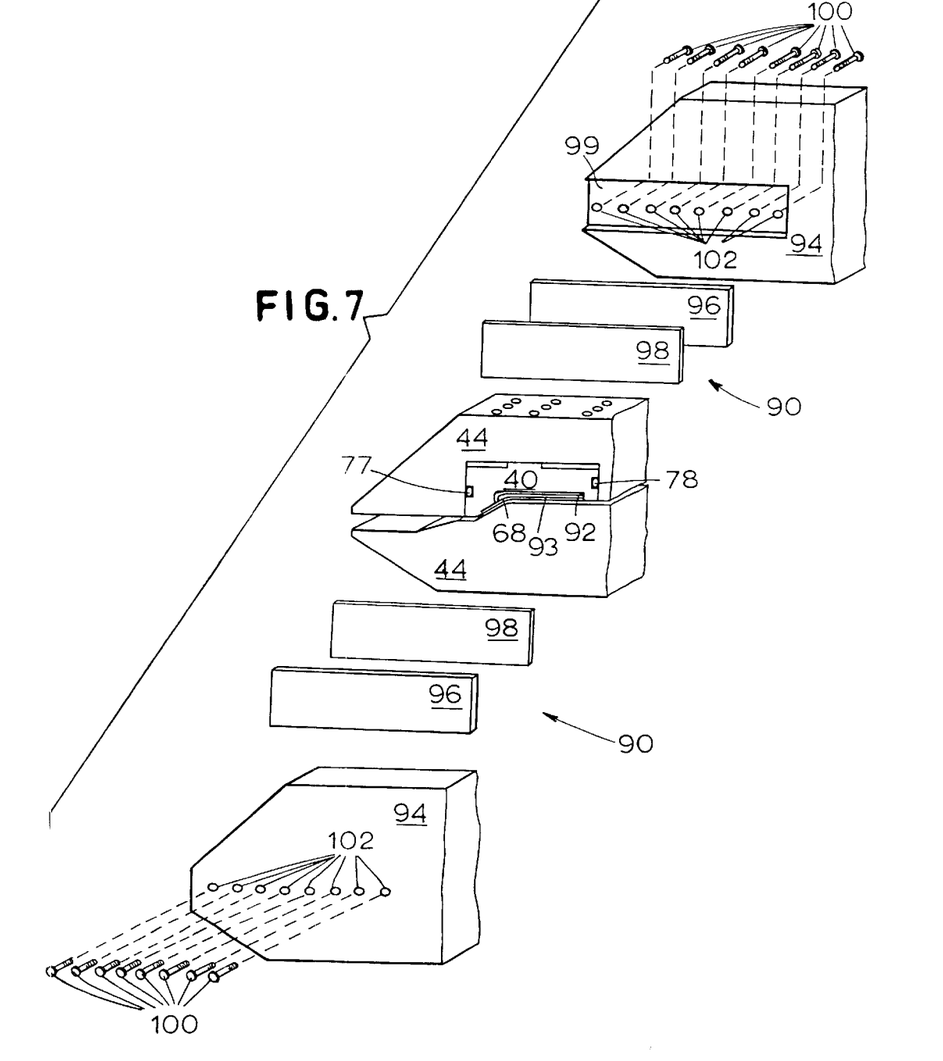
FIG. 7 comprises an exploded perspective view of a sealing apparatus for the flow control device of FIGS. 2–6.

Shown in FIG. 7 is the flow control device 40 disposed within the die 44 and a sealing apparatus 90 disposed adjacent end portions 92 of the flow control device 40 and the die 44. The sealing apparatus 90 forms a tight seal between a built-up portion 93 of the flexible membrane 68 and end plates 94 of the die 44. Each sealing apparatus 90 includes one or more backing plates 96 and a gasket 98 disposed in side-by-side relationship in a recess 99 in each end plate 94. The gasket 98 is made of any suitable material capable of withstanding the die environment. One or more force transmitting members 100, which may be threaded bolts or screws, are disposed in bores 102 in the end plate 94 and push against the backing plate 96. The backing plate 96, in turn, pushes against the gasket 98 and causes the gasket 98 to seal against the built-up portions 93 of the flexible membrane 68. The force causing the gasket 98 to move is preferably directed transversely to the direction of movement of the flexible membrane 98.

Preferably, as seen in FIG. 3, each built-up portion may comprise a curved member 103 which is preferably (although not necessarily) rectangular in cross-section and which is welded or otherwise joined to or formed with the membrane 68 contiguous with an edge 104 of the membrane 68. Also preferably, each curved member 103 is sufficiently thin and narrow to permit adequate adjustability of the membrane 68, and further has a coefficient of thermal expansion (CTE) similar or identical to the CTE of the membrane 68. The curved members 103 present flat sealing surfaces to the gaskets 98 so that the gaskets 98 are not damaged by the thin edges of the membrane 68 and so that the ends of the membrane 68 can slide over the gaskets 68 during profile adjustment.

The sealing apparatus 90 prevents leakage of material between the die 44 and the flexible membrane 68. Furthermore, this sealing arrangement does not significantly restrict the movement and adjustment of the flexible membrane 68 and, thus, does not significantly interfere with the ability to influence material flow past the flow control device 40.

Figure 8:
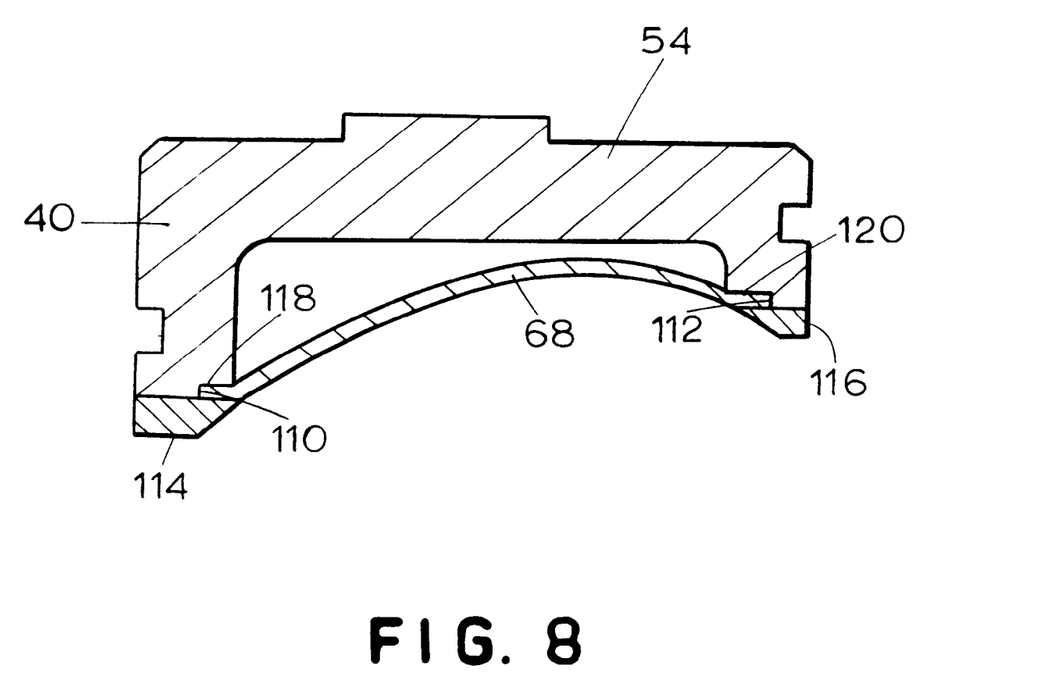
FIG. 8 comprises a cross-sectional view of a further embodiment of a flow control device according to the present invention.

As seen in FIG. 8, the membrane 68 can be retained within opposed slots 110, 112 in the flow control device 40. The slots may be formed by cap members 114, 116 which are held in position overlying channeled portions 118, 120 of the main body 54 by bolts or other fasteners (not shown). Alternatively, the cap members 114, 116 may be welded to the main body 54.

Dimensions for the flow control device 40 and the sealing apparatus of the present invention will vary depending on the flow characteristics of the material flowing through the die cavity 42 and the various process parameters.

In summary, the flow control device 40 of the present invention is an improvement over the above-described prior art device 10. Specifically, the flow control device 40, unlike the prior art device 10, is not tapered, and hence is more easily manufactured to the required degree of precision. Additionally, manufacturing tolerances can be relaxed as compared with the prior art device 10 because a range of gap dimensions can be eliminated by the movement of the side portions 58, 60 into engagement with the side surfaces 50, 52. Furthermore, installation of the device 40 is simplified and cheaper since it is easier to machine the channel 46 owing to the fact that it has non-tapered sidewalls. Still further, manufacture of an aftermarket flow control device without the original tooling is no longer a problem. Additionally, the sealing apparatus does not significantly restrict movement of the flexible membrane and, thus, does not interfere with flow control.

The foregoing description is given for clearness of understanding only, and no unnecessary limitations should be understood therefrom, as modifications within the scope of the invention will be apparent to those skilled in the art.

What is claimed is:

1. A flow control device, comprising
    a flexible membrane movable in a certain direction and having a built-up end portion;
    a gasket disposed adjacent the end portion; and
    means for causing the gasket to apply a force against the built-up end portion in a direction transverse to the certain direction such that the gasket seals against the flexible membrane.

2. The flow control device of claim 1, wherein the causing means comprises a backing plate disposed adjacent the gasket and means for applying a force against the backing plate.

3. The flow control device of claim 2, wherein the applying means comprises a screw threaded in an end plate.

4. The flow control device of claim 3, wherein the end plate includes a recess within which the backing plate and the gasket are disposed.

5. The flow control device of claim 1, wherein the built-up end portion comprises a member adjacent an edge of the membrane.

6. The flow control device of claim 5, wherein the member is curved.

7. The flow control device of claim 6, wherein the member is welded to the membrane.

8. The flow control device of claim 6, wherein the member is integrally formed with the membrane.

9. A flow control device, comprising:
    a main body having opposed slots; and
    a membrane disposed in the opposed slots and movable in a particular direction, wherein the membrane includes built-up end portions and sealing apparatus in contact with the built-up end portions and wherein each built-up end portion includes curved members secured adjacent an edge of the membrane.

10. The flow control device of claim 9, wherein the slots are formed by cap members secured over channeled portions.

* * * * *

UNITED STATES PATENT AND TRADEMARK OFFICE
CERTIFICATE OF CORRECTION

PATENT NO. : 6,367,776 B1
DATED : April 9, 2002
INVENTOR(S) : Lippert et al.

It is certified that error appears in the above-identified patent and that said Letters Patent is hereby corrected as shown below:

Column 1,
Line 3, please insert the paragraph:
-- This is a divisional of application Serial No. 08/876,947 filed June 16, 1997. --

Signed and Sealed this

Twenty-second Day of October, 2002

Attest:

Attesting Officer

JAMES E. ROGAN
Director of the United States Patent and Trademark Office